(12) United States Patent
Kang

(10) Patent No.: US 12,097,940 B2
(45) Date of Patent: Sep. 24, 2024

(54) HIGH EFFICIENCY ROTATING EQUIPMENT HAVING CONTRA-ROTATING PROPELLER

(71) Applicant: VAM CO., LTD., Changwon-si (KR)

(72) Inventor: Dohyun Kang, Changwon-si (KR)

(73) Assignee: VAM CO., LTD., Changwon-si (KR)

( * ) Notice: Subject to any disclaimer, the term of this patent is extended or adjusted under 35 U.S.C. 154(b) by 178 days.

(21) Appl. No.: 17/706,204

(22) Filed: Mar. 28, 2022

(65) Prior Publication Data

US 2023/0128150 A1   Apr. 27, 2023

(30) Foreign Application Priority Data

Oct. 22, 2021 (KR) ........................ 10-2021-0142021

(51) Int. Cl.

| | |
|---|---|
| *B63H 1/16* | (2006.01) |
| *B63H 5/10* | (2006.01) |
| *B63H 21/17* | (2006.01) |
| *B64C 11/00* | (2006.01) |
| *B64C 11/48* | (2006.01) |
| *B64D 27/24* | (2024.01) |
| *B63H 23/00* | (2006.01) |

(52) U.S. Cl.
CPC ................ *B63H 1/16* (2013.01); *B63H 5/10* (2013.01); *B63H 21/17* (2013.01); *B64C 11/001* (2013.01); *B64C 11/48* (2013.01); *B64D 27/24* (2013.01); *B63H 2001/165* (2013.01); *B63H 2023/005* (2013.01)

(58) Field of Classification Search
CPC . B63H 1/16; B63H 5/10; B63H 21/17; B63H 2001/165; B63H 2005/1258; B63H 2023/005; B64C 11/001; B64C 11/48; B64D 27/24; B64U 30/26; B64U 30/27; B64U 50/19; H02K 1/278; H02K 7/003; H02K 7/14; H02K 16/04
See application file for complete search history.

(56) References Cited

U.S. PATENT DOCUMENTS

| | | | | |
|---|---|---|---|---|
| 5,010,729 | A | * | 4/1991 | Adamson ................ F02K 3/072 416/129 |
| 5,183,222 | A | * | 2/1993 | Ramsey, Jr. ............. H02K 7/14 310/67 R |

(Continued)

FOREIGN PATENT DOCUMENTS

| | | |
|---|---|---|
| KR | 1020190036890 A | 4/2019 |
| KR | 1020210080117 A | 6/2021 |

OTHER PUBLICATIONS

Sang-Hoon Shin et al., "A Basic Study for the Application of the Shafting System for the Contra-Rotating Propeller". Journal of the Korea Academia-Industrial cooperation Society vol. 21, No. 7 pp. 391-398, 2020.

*Primary Examiner* — Dapinder Singh
(74) *Attorney, Agent, or Firm* — Rabin & Berdo, P.C.

(57) ABSTRACT

The present invention relates to rotating equipment, and more specifically, to high efficiency rotating equipment which generates thrust through contra-rotating or produces electricity. The rotating equipment includes: a plurality of propeller modules (10, 20) including a plurality of blades (11, 21) installed inside along a circumferential direction; and a rotary module (40) which rotates the plurality of propeller modules (10, 20) or is rotated.

6 Claims, 12 Drawing Sheets

(56) References Cited

U.S. PATENT DOCUMENTS

| | | | |
|---|---|---|---|
| 7,906,885 B2* | 3/2011 | Lu | H02K 1/14 310/156.32 |
| 8,963,356 B2* | 2/2015 | Roos | H02K 5/12 290/52 |
| 2020/0001960 A1* | 1/2020 | Oran | B63H 1/16 |

* cited by examiner

HIGH EFFICIENCY ROTATING EQUIPMENT HAVING CONTRA-ROTATING PROPELLER

CROSS-REFERENCE TO RELATED APPLICATIONS

This U.S. non-provisional patent application claims priority under 35 U.S.C. § 119 of Korean Patent Application No. 10-2021-0142021, filed on Oct. 22, 2021, the entire contents of which are hereby incorporated by reference.

FIELD OF THE INVENTION

The present invention disclosed herein relates to rotating equipment, and more specifically, to high efficiency rotating equipment which generates thrust through contra-rotating or produces electricity.

BACKGROUND ART

Contra-rotating propellers (CRPs) are a fluid combined propulsion system in which two propellers rotating in directions opposite to each other are arranged in the same axis, and the rotational energy lost from the front propeller is collected by the rear propeller to improve the overall propulsion efficiency ("A Basic Study for the Application of the Shafting System for the Contra-Rotating Propeller", Journal of Korea Academia-Industrial cooperation Society, Vol. 21, No. 7 pp. 391-398). As additional advantages, there are effects of improving straight running performance of a vessel and reducing noise and vibration.

In particular, the contra-rotating propellers (CRPs) are also applied to an electric propulsion method in consideration of the above advantages, and thus, there is an urgent need to develop technology for the CRPs.

(Paten Document 1) KR 10-2019-0036890 A
(Paten Document 2) KR 10-2021-0080117 A

SUMMARY OF THE INVENTION

The present invention provides high efficiency rotating equipment integrated with an electromotive structure by recognizing the above trend.

In accordance with an embodiment of the present invention, rotating equipment includes: a plurality of propeller modules (10, 20) including a plurality of blades (11, 21) installed inside along a circumferential direction; and a rotary module (40) which rotates the plurality of propeller modules (10, 20) or is rotated.

The rotary module (40) may include: a body (41) in which the plurality of propeller modules (10, 20) are arranged in an axial direction and which has a hollow structure so that the plurality of blades (11, 21) are installed on an inner circumferential surface thereof; and a plurality of electric rotary drives (100, 200) which are installed in the body (41), respectively correspond to the plurality of propeller modules (10, 20), and are rotated by a power supply (80).

The electric rotary drives (100, 200) may include: one or more stators (110, 210) which are fixed to the body (41) at positions corresponding to the respective propeller modules (10, 20); and one or more rotors which are coupled to the respective propeller modules (10, 20) and rotated by magnetic interaction with the stators (110, 210).

Each of the stators (110, 210) may be installed in a pair with the rotor therebetween with respect to a radial direction.

The rotor may include: a plurality of permanent magnets (131) arranged at preset intervals along the circumferential direction; and a plurality of rotor cores (132) installed between the plurality of permanent magnets (131).

The rotor may include: a surface attachment-type permanent magnet installation (152); and a pair of surface attachment-type permanent magnets (151) which correspond to the respective pairs of the stators (110, 210) and are installed, along the circumferential direction, on an inner circumferential surface and an outer circumferential surface of the permanent magnet installation (152).

The rotary module (40) may include: a rotary shaft (60), of which at least one of the two ends is coupled to the propeller modules (10, 20); a body (41) configured to rotatably support the rotary shaft (60); and an electric rotary drive (100) which is installed in the body (41) and rotates the rotary shaft (60) coupled to the propeller modules (10, 20).

The electric rotary drive (100) may include: a stator (110) coupled to the body (41); and a rotor which is coupled to the rotary shaft (60) and rotated by magnetic interaction with the stator (110).

The stator (110) may be installed in a pair with the rotor therebetween with respect to a radial direction.

The rotor may include: a plurality of permanent magnets (131) arranged at preset intervals along the circumferential direction; and a plurality of rotor cores (132) installed between the plurality of permanent magnets (131).

The rotor may include: a surface attachment-type permanent magnet installation (152); and a pair of surface attachment-type permanent magnets (151) which correspond to the respective pairs of the stators (110, 210) and are installed, along the circumferential direction, on an inner circumferential surface and an outer circumferential surface of the permanent magnet installation (152).

At least one of the plurality of propeller modules (10, 20) may be set to rotate in a different direction from the other.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

Each of FIGS. 6 and 7 is a perspective view showing rotating equipment, in which a double air gap motor structure is applied and which has an axial driving method, as another example of the rotating equipment according to the present invention.

DETAILED DESCRIPTION OF THE PREFERRED EMBODIMENTS

Hereinafter, high efficiency rotating equipment according to the present invention will be described with reference to the accompanying drawings.

As illustrated in FIGS. 1 to 8, the rotating equipment according to the present invention includes: a plurality of propeller modules 10 and 20 including a plurality of blades 11 and 21 installed inside along a circumferential direction; and a rotary module 40 which rotates the plurality of propeller modules 10 and 20 or is rotated.

Here, the rotating equipment is a propulsion system, and one or more rotating equipment is installed in a moving system (not shown) such as an airplane, a drone, a ship, and a submarine and creates movement of the moving system by using the flow of fluid. The rotating equipment may have various structures depending on the configuration of the moving system.

Also, on the contrary, the rotating equipment according to the present invention may be applied to a power generation device that converts energy of the flowing fluid into electric energy.

The plurality of propeller modules 10 and 20 are configured to include the plurality of blades 11 and 21 installed inside along the circumferential direction, and may have various configurations according to coupling structures with the rotary module 40 which will be described later.

Meanwhile, the plurality of propeller modules 10 and 20 may be configured to include: the plurality of blades 11 and 21 installed inside along the circumferential direction; and supports 12 and 22 coupled to the plurality of blades 11 and 21 along the circumferential direction.

The plurality of blades 11 and 21 are installed in the circumferential direction and configured to rotate to form the fluid flow or, on the contrary, configured to be rotated by the fluid flowing in the axial direction, and various configurations such as detailed profiles and numbers are possible depending on environments in which the rotating equipment is installed.

The supports 12 and 22 are configured to be coupled to the plurality of blades 11 and 21 along the circumferential direction, and various configurations are possible depending on coupling structures with the rotary module 40 to be coupled thereto.

For one example, as illustrated in FIGS. 1 to 5B, the supports 12 and 22 may form a cylindrical shape, and the plurality of blades 11 and 21 may be installed on the inner circumferential surfaces of the cylindrical supports 12 and 22.

Figure 6:
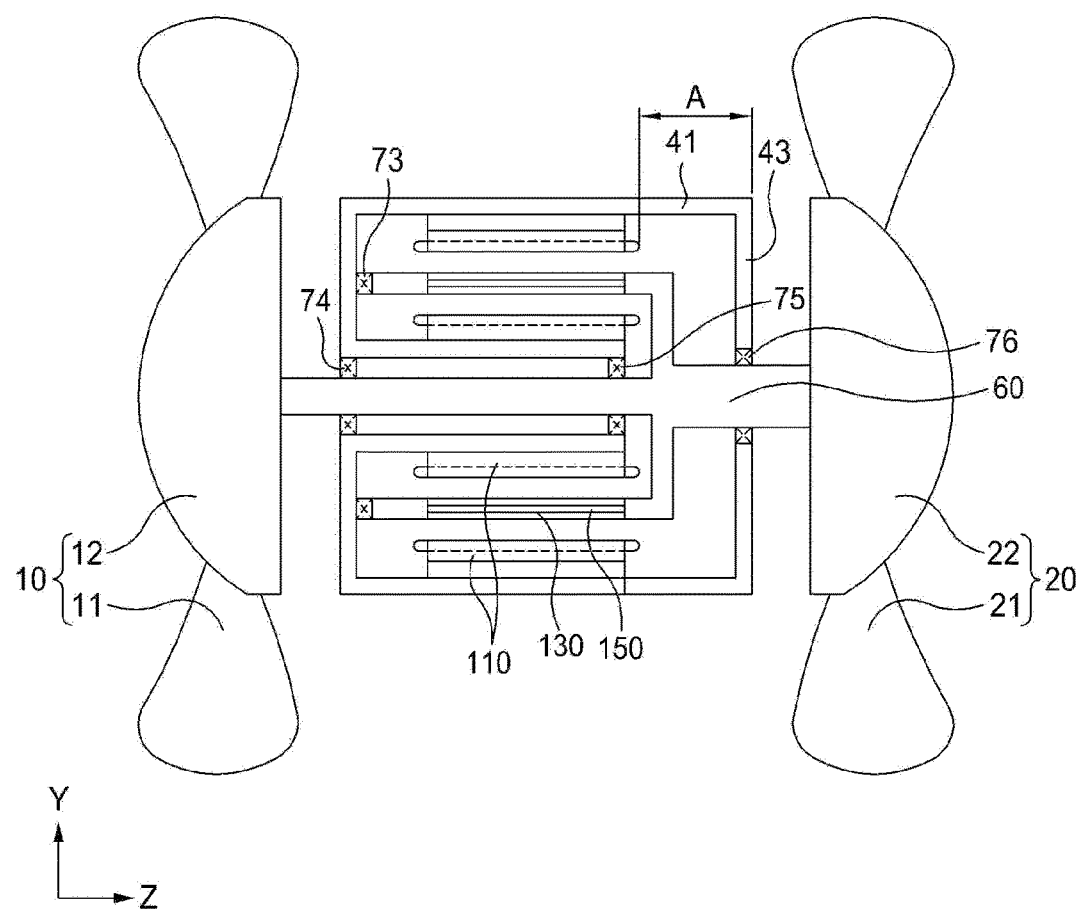
Figure 7:
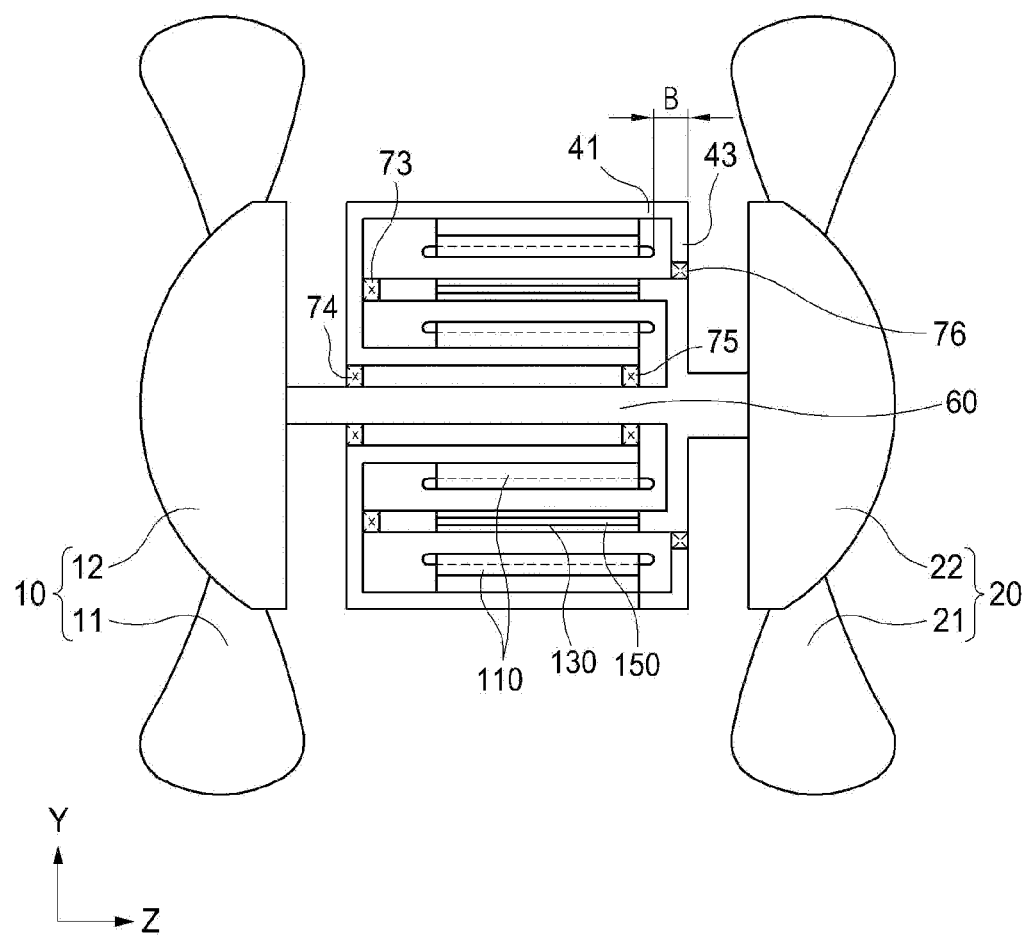

For another example, as illustrated in FIGS. 6 and 7, the supports 12 and 22 may form a cylinder shape or cone shape, and the plurality of blades 11 and 21 may be installed on the outer circumferential surfaces of the supports 12 and 22.

Meanwhile, the plurality of blades 11 and 21 are installed along the circumferential direction, and configured to rotate to form the flow of fluids such as water and air or configured to be rotated by the flow of fluids to generate thrust for an object to be propelled to which a propulsion system is coupled (a power generator for generating electricity, when rotating), and the number, cross-sectional structure, and radial directional length thereof may be determined according to installation conditions.

Figure 1:
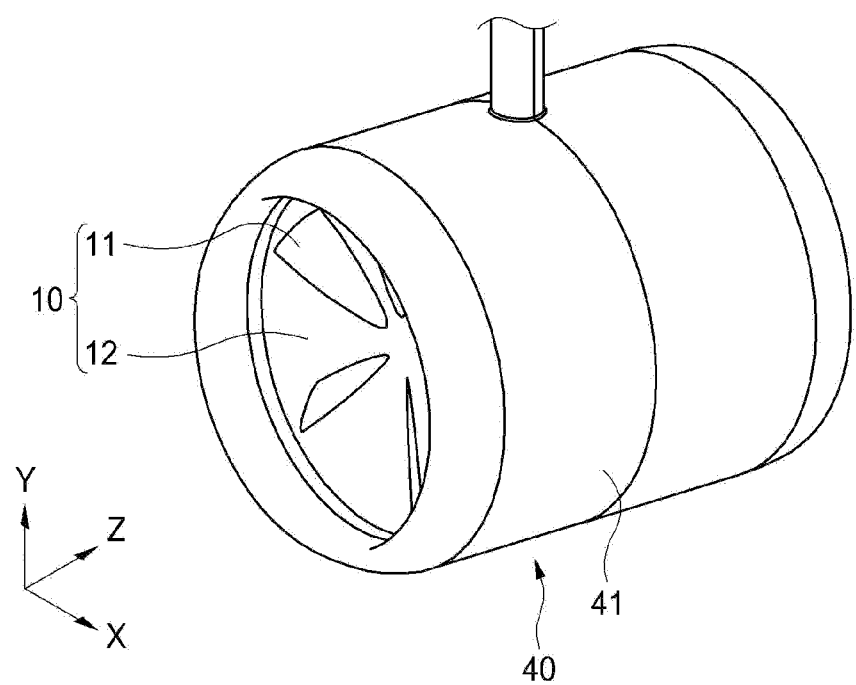
FIG. 1 is a perspective view showing rotating equipment having a rim driving method, as one example of rotating equipment according to the present invention.
Figure 2A:
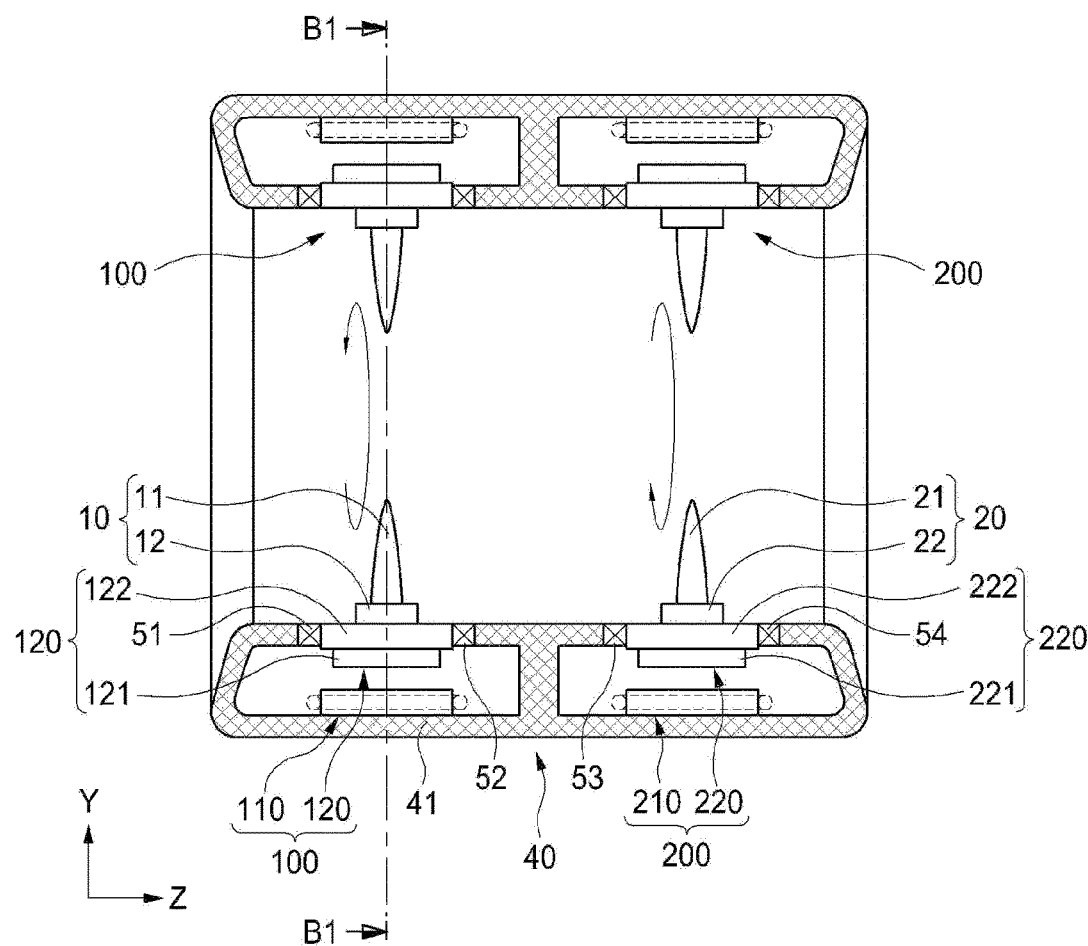
FIG. 2A is a cross-sectional view showing a first embodiment of the rotating equipment of FIG. 1.
Figure 2B:
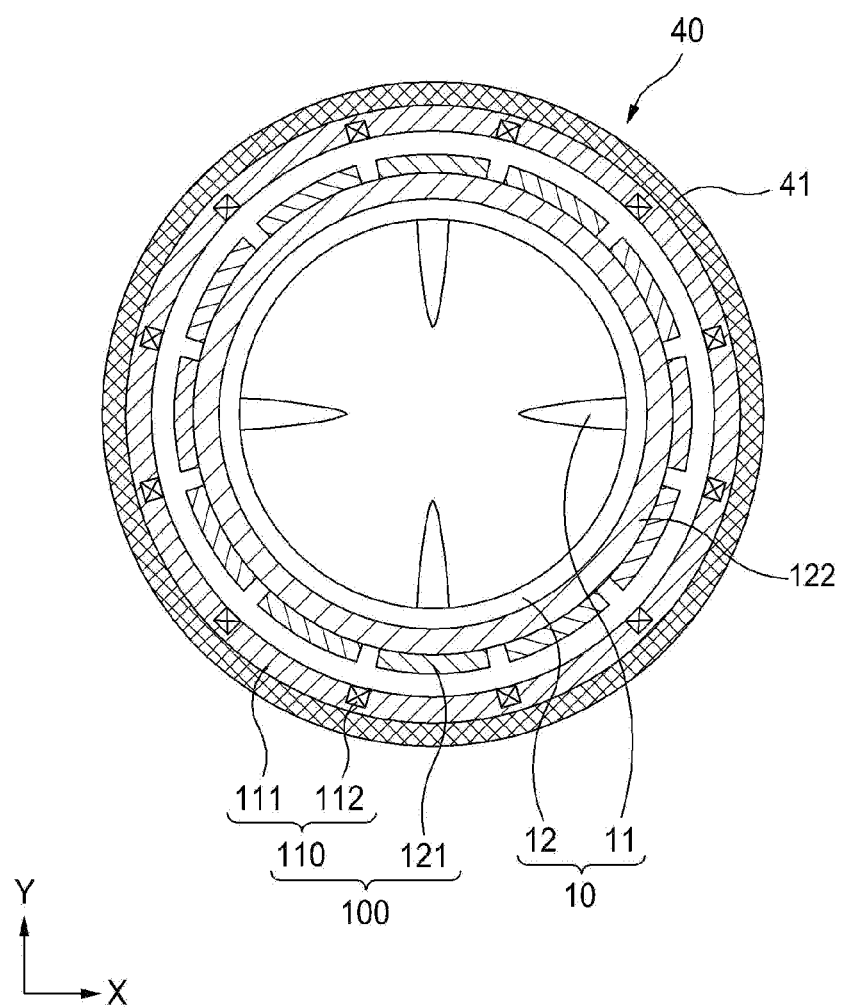
FIG. 2B is a cross-sectional view taken along line B1-B1 of FIG. 2A.

The rotary module 40 is configured to rotate the plurality of propeller modules 10 and 20 or configured to be rotated, and various embodiments such as a rim driving structure as illustrated in FIG. 1 or an axial driving structure as illustrated in FIG. 6 are possible according to rotation coupling structures with the plurality of propeller modules 10 and 20.

For one example, as illustrated in FIGS. 1 to 5B, the rotary module 40 may include: a body 41 in which the plurality of propeller modules 10 and 20 are arranged in an axial direction and which has a hollow structure so that the plurality of blades 11 and 21 are installed on an inner circumferential surface thereof; and a plurality of electric rotary drives 100 and 200 which are installed in the body 41, respectively correspond to the plurality of propeller modules 10 and 20, and are rotated by a power supply 80.

The body 41 is configured to have the hollow structure such that the plurality of propeller modules 10 and 20 are arranged in the axial direction and the plurality of blades 11 and 21 are installed on the inner circumferential surface thereof, and various configurations are possible according to coupling structures with the plurality of propeller modules 10 and 20 which will be described later.

For example, the body 41 may have various structures such as a duct structure so that the flow of fluids is guided by the rotation of the blades 11 and 21 through the plurality of propeller modules 10 and 20.

Also, the body 41 may be configured such that electrical components are protected from water when the rotating equipment is used offshore or underwater. Thus, main elements of the electric rotary drives 100 and 200, which will be described later, that is, a portion of components of stators 110 and 210 and rotors 120 and 220 may be sealed and installed.

Meanwhile, the body 41 is provided such that the electric rotary drives 100 and 200, which will be describe layer, are installed thereon, or may be coupled to the moving system described above by one or more coupling units.

The coupling unit is configured to couple the body 41 to the moving system, and various configurations are possible according to the coupling structures.

The plurality of electric rotary drives 100 and 200 are installed in the body 41, respectively correspond to the plurality of propeller modules 10 and 20, and are configured to be rotated by the power supply 80, and various configurations are possible according to the driving structure thereof.

For example, as illustrated in FIGS. 1 to 5B, the plurality of electric rotary drives 100 and 200 may include a plurality of drives in the axial direction, for example, a first electric rotary drive 100 and a second electric rotary drive 200.

Also, the electric rotary drives 100 and 200 may include: stators 110 and 210 which are fixed to the body 41 at positions corresponding to the respective propeller modules 10 and 20; and rotors 120 and 220 which are coupled to the respective propeller modules 10 and 20 and rotated by magnetic interaction with the stators 110 and 210.

The stators 110 and 210 are configured to be fixed to the body 41 at positions corresponding to the respective propeller modules 10 and 20, and various configurations are possible according to combined configurations with the rotors 120 and 220 which will be described later.

For example, as illustrated in FIGS. 2A, 2B, 5A, and 5B, one of the stators 110 and 210 may be installed on the inner circumferential surface inside the body 41.

Also, as illustrated in FIGS. 3A to 4B, a pair of stators 110 and 210 may be installed respectively on the inner circumferential surface and the outer circumferential surface inside the body 41, that is, a double air gap structure disclosed in Patent Document 1 may be applied.

Figure 3A:
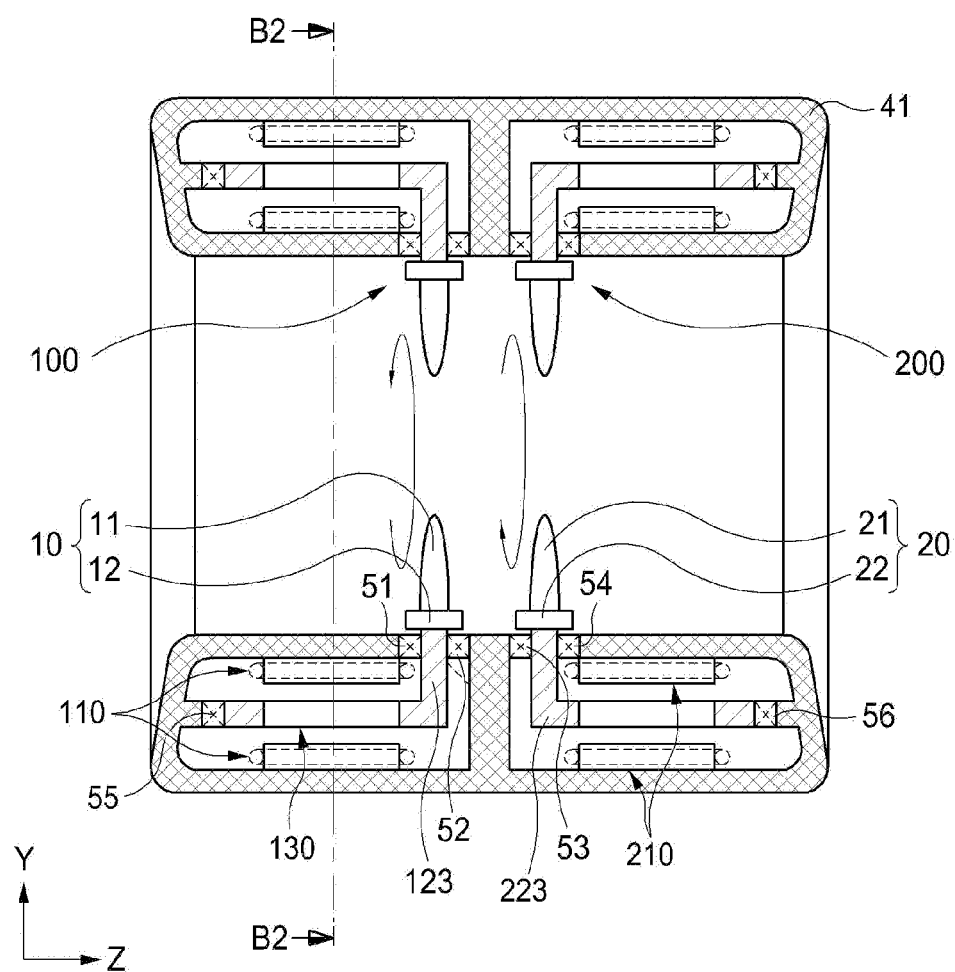
FIG. 3A is a cross-sectional view showing an example, in which a vernier-type double air gap motor structure is applied, as a second embodiment of the rotating equipment of FIG. 1.
Figure 3B:
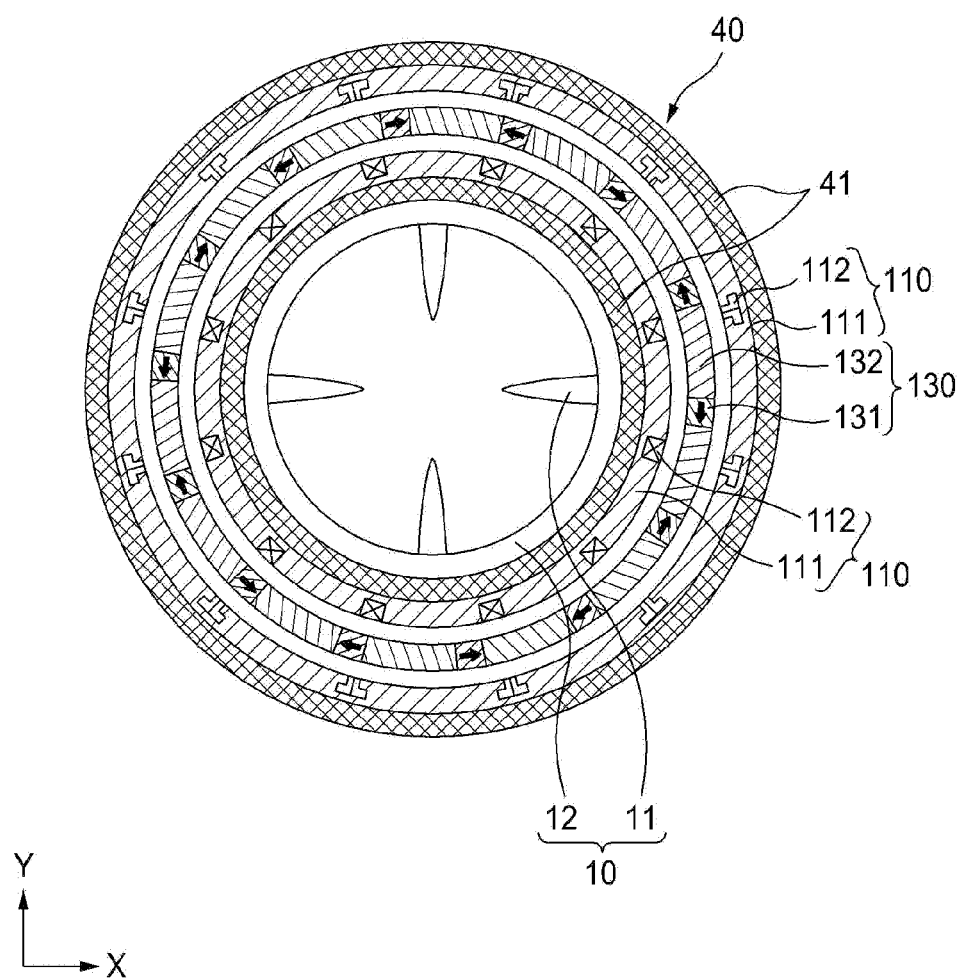
FIG. 3B is a cross-sectional view taken along line B2-B2 of FIG. 3A.
Figure 4A:
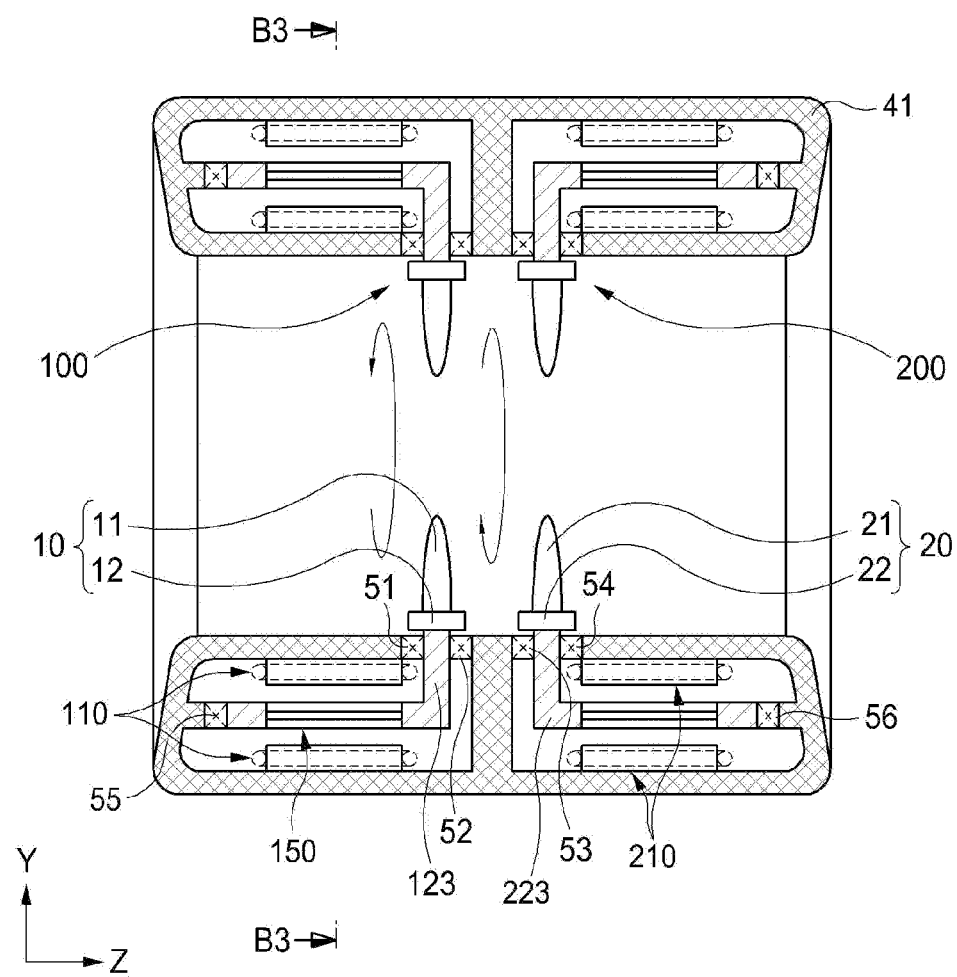
FIG. 4A is a cross-sectional view showing an example, in which a surface attachment-type permanent magnet dual air gap motor structure is applied, as a third embodiment of the rotating equipment of FIG. 1.
Figure 4B:
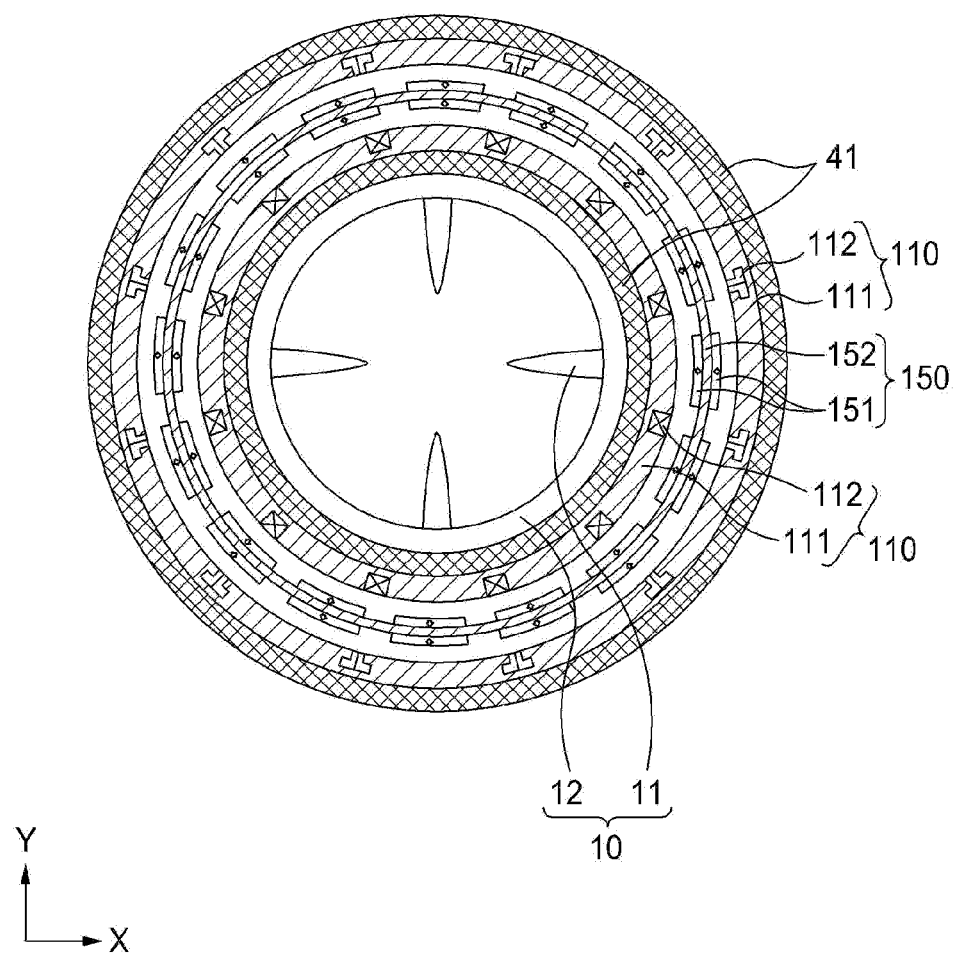
FIG. 4B is a cross-sectional view taken along line B3-B3 of FIG. 4A.

That is, with respect to the radial direction, a pair of the stators 110 and 210 may be installed with a vernier-type dual air gap rotor 130 therebetween as illustrated in FIGS. 3A and 3B or with a surface attachment-type double air gap rotor 150 therebetween as illustrated in FIGS. 4A and 4B.

Hereinafter, the case in which the pair of stators 110 and 210 are installed will be descried with reference to FIGS. 3A and 3B an FIGS. 4A and 4B.

For one example, as illustrated in FIGS. 3A and 3B, in case of the vernier-type double air gap structure, the rotor 130 is installed between the pair of stators 110 and 210 and may form a first air gap and a second air gap with the stators 110 and 210 on the inner circumferential surface and the outer circumferential surface, respectively, that is, may form the double air gap structure.

Also, the rotor 130 may include: a plurality of permanent magnets 131 arranged at preset intervals along the circumferential direction; and a plurality of rotor cores 132 installed between the plurality of permanent magnets 131.

For another example, as illustrated in FIGS. 4A and 4B, in case of the surface attachment-type double air gap structure, the rotor 150 is installed between the pair of stators 110 and 210 and may form a first air gap and a second air gap with the stators 110 and 210 on the inner circumferential surface and the outer circumferential surface, respectively, that is, may form the double air gap structure.

Also, the rotor 150 may include: a surface attachment-type permanent magnet installation 152; and a pair of surface attachment-type permanent magnets 151 which correspond to the respective pairs of the stators 110 and 210 and are installed, along the circumferential direction, on an inner circumferential surface and an outer circumferential surface of the permanent magnet installation 152.

Meanwhile, rotors 130 illustrated in FIGS. 3A and 3B and rotors 150 illustrated in FIGS. 4A and 4B may be connected to the propeller modules 10 and 20, which are installed inside the body 41, through connectors 123 and 223, respectively.

The connectors 123 and 223 may have various configurations such as being formed as a separate member or formed integrally.

In addition, it is preferable that the connectors 123 and 223 rotate while being supported on the body 41, and thus the connectors 123 and 223 may be rotatably supported on the body 41 by one or more bearings 51 and 56.

Meanwhile, each of the stators 110 and 210 may include a core 111 installed in the body 41 and a winding coil 112 wound on the core 111.

The core 111 is installed in the body 41, and the winding coil 112 is wound thereon. The core 111 may be constituted by a magnetic material.

The winding coil 112 is a coil which is wound on the core 111 and generates magnetic flux by the application of power, and various configurations are possible.

Meanwhile, the stators 110 and 210 may have various structures according to the principles of rotation of the vernier-type double air gap rotor 130 and the surface attachment-type double air gap rotor 150.

The vernier-type double air gap rotor 130 and the surface attachment-type double air gap rotor 150 are coupled to the respective propeller modules 10 and 20 and rotated by magnetic interaction with the stator 110 and 210, and various configurations are possible.

For example, the vernier-type double air gap rotor 130 may include a plurality of vernier-type double air gap rotor permanent magnets 131 arranged in the circumferential direction and a vernier-type double air gap rotor core 132, and the surface attachment-type double air gap rotor 150 may include a plurality of surface attachment-type permanent magnets 151 arranged in the central direction and a surface attachment-type magnet installation 152.

The plurality of vernier-type double air gap rotor permanent magnets 131 and the surface attachment-type permanent magnets 151 are configured to rotate the vernier-type double air gap rotor 130 and the surface attachment-type double air gap rotor 150 by the magnetic interaction with the stators 110 and 210 described above, and various configurations are possible according to rotation structures with the stator 110 and 210.

Meanwhile, the rotors 130 and 150 and the connectors 123 and 223 need to be installed rotatably relative to the body 41, and thus may be supported and installed so as to be rotatable relative to the body 41 by one or more bearings 51 to 56. Thus, stable rotation relative to the body 41 is possible.

The bearings 51 to 56 are installed so that the rotors 130 and 150 and the connectors 123 and 223 can stably rotate relative to the body 41, and various configurations are possible.

Particularly, in a case where the rotating equipment according to the present invention is installed offshore or underwater, some of the bearings 51 to 56 may be constituted by mechanical seals capable of preventing water from flowing into the body 41 in which the stators 110 and 210 are installed.

Meanwhile, the configuration, in which the structure disclosed in Patent Document 1 is applied, will be descried in more detail with reference to FIGS. 3A and 3B.

The stators 110 of the rotary module 40 illustrated in FIGS. 3A and 3B are installed respectively on the inner circumferential side and the outer circumferential side of the vernier-type double air gap rotor 130 having a cylindrical structure, and may include: a pair of cores 111 having teeth-shaped structures formed respectively on the outer circumferential surface and the inner circumferential surface so that winding coils 112 are wound thereon; and the winding coils 112 wound on the teeth-shaped structures of the cores 111.

Here, when a type of power to be applied, for example, three-phase power is applied, the teeth-shaped structures of the cores 111 and the arrangements of the winding coils 112 may be set to a multiple of three.

Meanwhile, it is preferable that the core 111 of the stator 110 positioned inside, among the stators 110, has a hollow cylinder structure when taking into consideration that the propeller modules 10 and 20 are installed on the inner circumferential side.

The vernier-type double air gap rotor 130 may include: a plurality of vernier-type double air gap rotor permanent magnets 131 coupled along the circumferential direction; and a vernier-type double air gap rotor cores 132.

Particularly, in order to achieve rotation in the constant direction due to electromagnetic interaction of magnetic flux by the three-phase power applied to the winding coils 112 of the stators 110 installed on the inner circumferential side and the outer circumferential side, the plurality of vernier-type double air gap permanent magnets 131 are installed such that N poles and S poles (→←) are alternately provided along the circumferential direction (indicated as →, ← with respect to magnetic pole direction in the drawing). Also, the plurality of surface attachment-type permanent magnets 151 may be installed such that N poles and S poles (↑, ↓) are alternately provided along the radial direction (indicated as ↑, ↓, with respect to magnetic pole direction in the drawing).

Figure 5A:
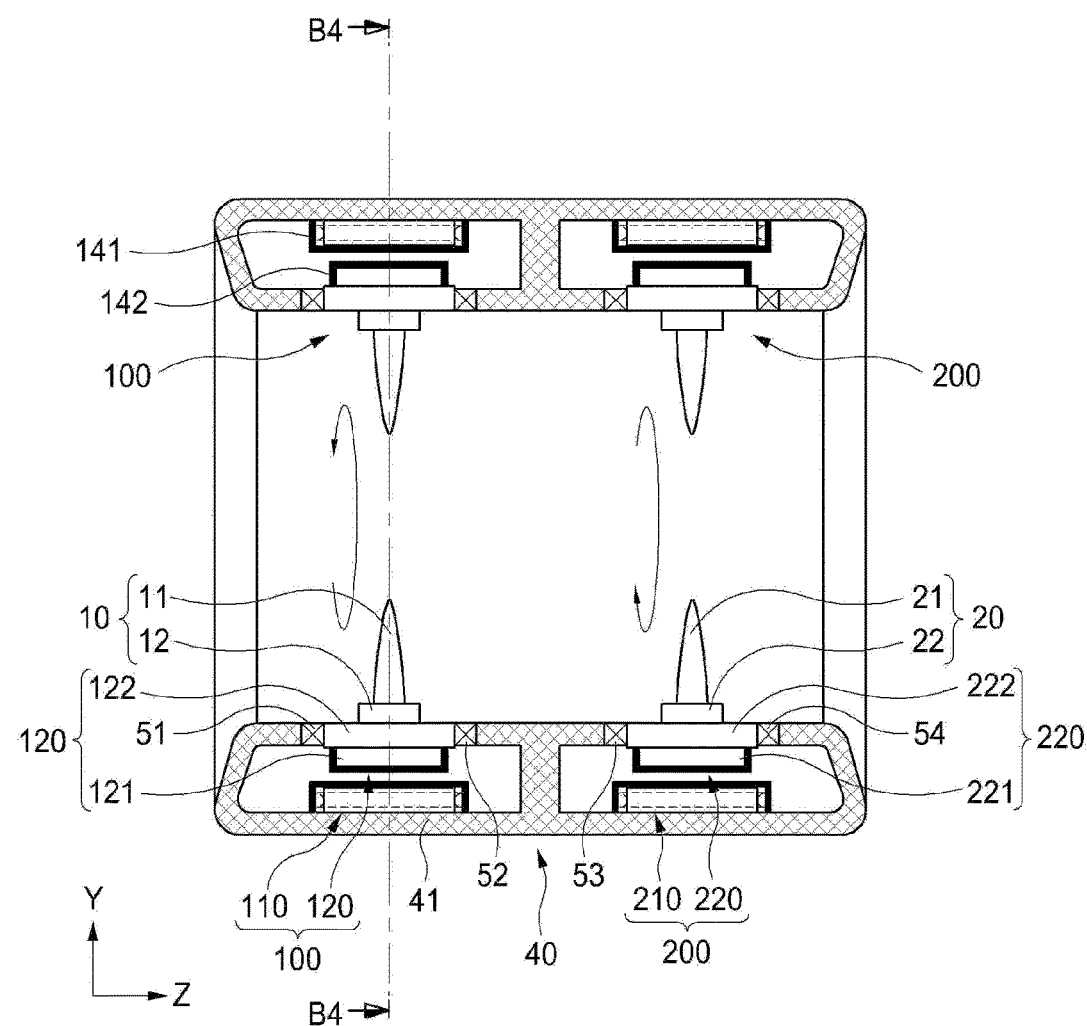
FIG. 5A is a cross-sectional view showing a fourth embodiment of the rotating equipment of FIG. 1.
Figure 5B:
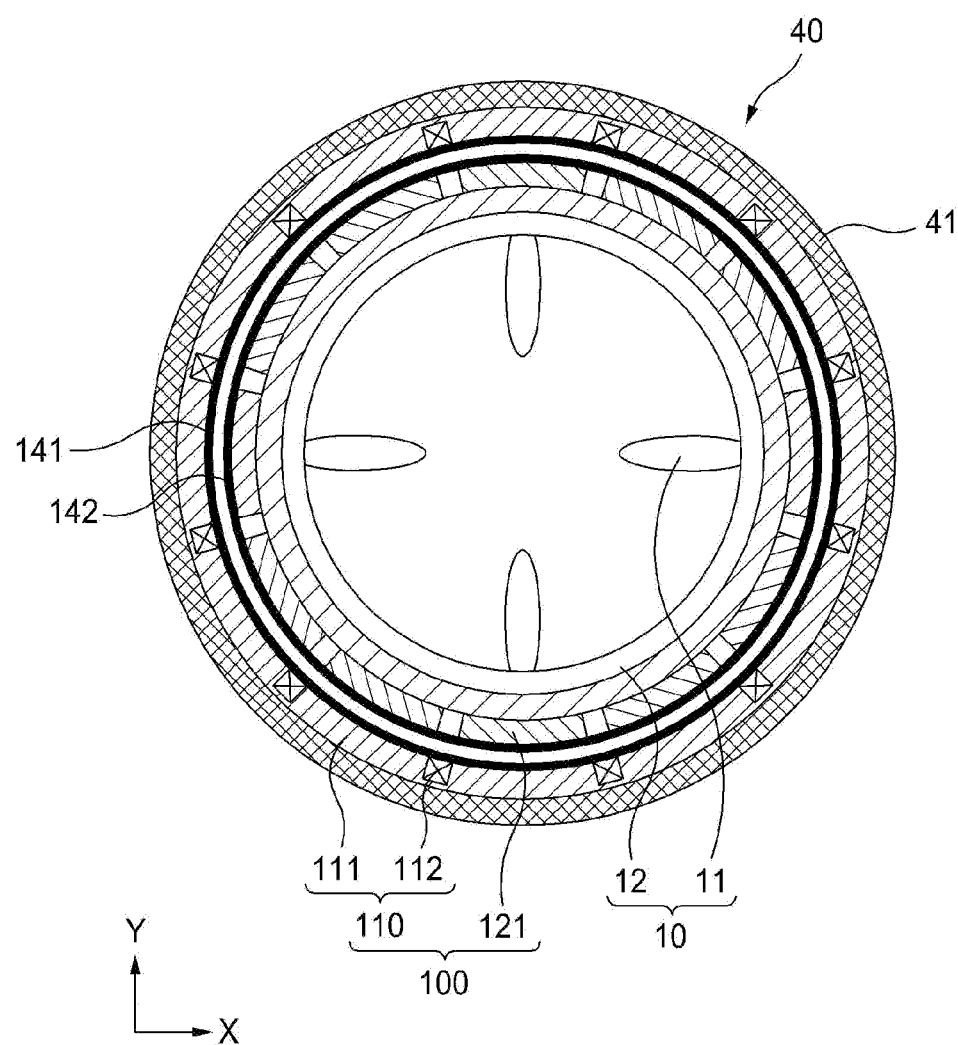
FIG. 5B is a cross-sectional view taken along line B4-B4 of FIG. 5A.

Meanwhile, in a case where the rotating equipment according to the present invention is installed offshore or underwater, water may flow into the body 41 in which the rotors 110 and 210 are installed. Thus, in order to prevent this, as illustrated in FIGS. 5A and 5B, a first can member 141 for sealing and covering the stators 110 and 210 and a second can member 142 for sealing and covering permanent magnets 121 and 221 of the rotors 120 and 220 may be provided.

The first can member 141 and the second can member 142 are members for sealing and protecting the stators 110 and 210 and the permanent magnets 121 and 221, and may be made of materials such as CFRP and epoxy through which the magnetic flux passes and may be installed through various methods such as coating, molding, and film coupling.

Figure 8A:
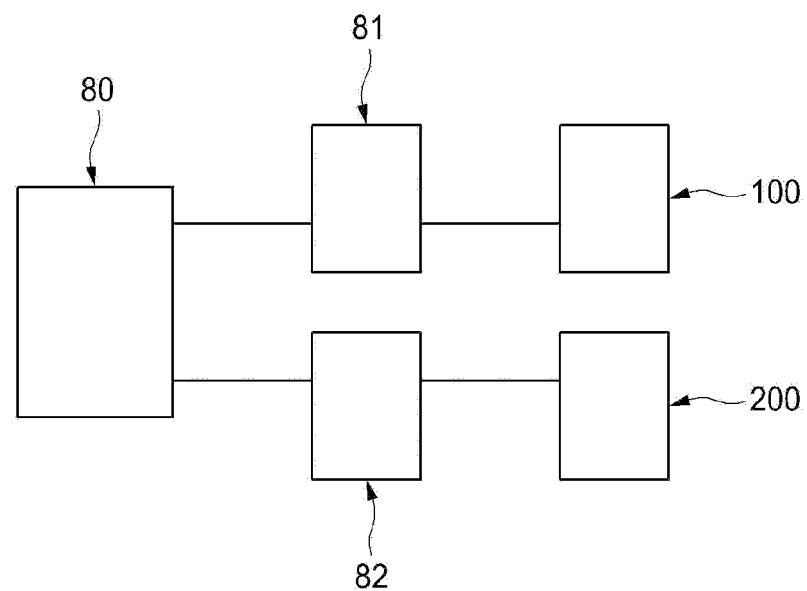
FIGS. 8A and 8B are schematic views showing configurations for supplying power to the rotating equipment illustrated in FIGS. 1 to 7.
Figure 8B:
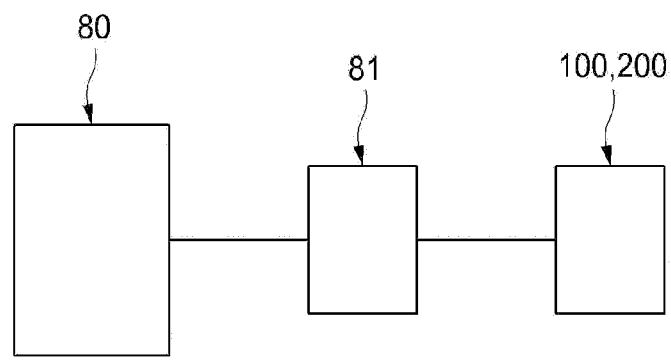

Meanwhile, the plurality of electric rotary drives 100 and 200 having the above configurations may be independently controlled by providing inverters 81 and 82 for independently performing control in a power supply 80 as illustrated in FIG. 8A, or may be controlled by one inverter 81 as illustrated in FIG. 8B.

Also, the plurality of electric rotary drives 100 and 200 having the above configurations may be controlled so that the propeller modules 10 and 20 rotate in the same direction or different directions.

Particularly, the plurality of electric rotary drives 100 and 200 may be controlled to rotate in a different direction from the neighboring propeller modules 10 and 20.

For example, at least one of the plurality of propeller modules 10 and 20 may rotate in a different direction from the other.

More particularly, in a case where the plurality of electric rotary drives 100 and 200 include a first electric rotary drive 100 rotating for a first propeller module 10 and a second electric rotary drive 200 rotating for a second propeller module 20, the first electric rotary drive 100 and the second electric rotary drive 200 may rotate such that the first propeller module 10 and the second propeller module 20 rotate in different directions, that is, generate contra-rotating.

For another example, as illustrated in FIGS. 6 and 7, the rotary module 40 may include: a rotary shaft 60, of which at least one of the two ends is coupled to the propeller modules 10 and 20; a body 41 rotatably supporting the rotary shaft 60; and an electric rotary drive 100 which is installed in the body 41 and rotates the rotary shaft 60 coupled to the propeller modules 10 and 20.

Here, as illustrated in FIGS. 6 and 7, supports 12 and 22 of the propeller modules 10 and 20 may form a cylinder shape or cone shape, and the plurality of blades 11 and 21 may be installed on the outer circumferential surfaces of the supports 12 and 22.

The rotary shaft 60 is configured such that at least one of the two ends thereof is coupled to the propeller modules 10 and 20, and rotated by the electric rotary drive 100. Various configurations such as single shaft and a plurality of shafts are possible.

Here, as illustrated in FIGS. 6 and 7, the two ends of the rotary shaft 60 may be coupled to the propeller modules 10 and 20.

Also, one end of the rotary shaft 60 may be coupled to one propeller module 20.

The body 41 is configured to rotatably support the rotary shaft 60, and various configurations are possible.

Meanwhile, the body 41 is provided such that the electric rotary drives 100 and 200 are installed thereon, or may be coupled to the moving system described above by one or more coupling units.

The coupling unit is configured to couple the body 41 to the moving system, and various configurations are possible according to the coupling structures.

The electric rotary drive 100 is installed in the body 41 and rotates the rotary shaft 60 to which the propeller modules 10 and 20 are coupled, and various configurations are possible.

For example, the electric rotary drive 100 may include: a stator 110 coupled to the body 41; and a vernier-type double air gap rotor 130 or a surface attachment-type double air gap rotor 150, which is coupled to the rotary shaft 60 and rotated by magnetic interaction with the stator 110.

The stator 110 is coupled to the body 41, and various configurations are possible.

For example, the stator 110 may include a core 111 installed in the body 41 and a winding coil 112 wound on the core 111.

The core 111 is installed in the body 41, and the winding coil 112 is wound thereon. The core 111 may be constituted by a magnetic material.

The winding coil 112 is a coil which is wound on the core 111 and generates magnetic flux by the application of power, and various configurations are possible.

Meanwhile, the stator 110 may have various structures according to the principles of rotation of the vernier-type double air gap rotor 130 and the surface attachment-type double air gap rotor 150 which will be described later.

The vernier-type double air gap rotor 130 and the surface attachment-type double air gap rotor 150 are coupled to the rotary shaft 60 and rotated by magnetic interaction with the stator 110, and various configurations are possible.

For example, each of the vernier-type double air gap rotor 130 and the surface attachment-type double air gap rotor 150 has same shape as those illustrated above in FIGS. 4A and 4B and FIGS. 5A and 5B.

In addition, it is preferable that the vernier-type double air gap rotor 130 and the surface attachment-type double air gap rotor 150 rotate while being supported on the body 41, and thus the vernier-type double air gap rotor 130 and the surface attachment-type double air gap rotor 150 may be rotatably supported on the body 41 by one or more bearings 73 to 76.

Meanwhile, the high efficiency rotating equipment according to the present invention has been described as, for example, a propulsion system in which the rotary module is constituted by a rotating motor and rotated by electricity applied to the rotary module, but on the contrary, the rotating equipment may be applied in a power generator in which the rotary module is rotated by the rotation of the propeller and generates electricity.

Here, the rotary module may be constituted as a power generation module which is rotated by the rotation of the propeller and generates electricity.

The high efficiency rotating equipment according to the present invention may provide rotating equipment with high efficiency as the propellers and the driving structures for the rotation thereof are integrated with each other.

In particular, the high efficiency rotating equipment according to the present invention may provide rotating equipment having high power and high efficiency as the propellers are installed in two or more rows.

Furthermore, the rotating equipment having higher efficiency may be provided as the propellers in two or more rows are configured to contra-rotate.

The above is merely described with respect to some preferred embodiments that may be implemented according to the present invention. Thus, as is well known, the scope of the present invention should not be construed as being limited by the above embodiments, and the technical ideas of the present invention described above and technical concepts on the basis of these technical ideas are considered to be included in the scope of the present invention.

What is claimed is:

1. Rotating equipment comprising:
    a plurality of propeller modules comprising a plurality of blades installed inside along a circumferential direction; and
    a rotary module for rotating the plurality of propeller modules or being rotated by the plurality of propeller modules,
    wherein the rotary module comprises:
    a body which has a hollow structure so that the plurality of blades are installed within the hollow structure and rotate around a longitudinal axis of the body; and
    a plurality of electric rotary drives which are installed in the body, respectively corresponding to the plurality of propeller modules, and are rotated by a power supply,
    wherein the plurality of propeller modules are arranged along the longitudinal axis of the body,
    wherein the electric rotary drives comprise:
    one or more stators which are fixed to the body at positions corresponding to respective propeller modules; and
    one or more rotors which are coupled to the respective propeller modules and rotated by magnetic interaction with the one or more stators, and
    wherein each of the one or more stators is installed in a pair with a rotor therebetween with respect to a radial direction, and
    wherein at least one of the plurality of propeller modules rotates in a different direction from another of the plurality of propeller modules.

2. The rotating equipment of claim 1, wherein the one or more rotors comprises:
    a plurality of permanent magnets arranged at preset intervals along the circumferential direction; and
    a plurality of rotor cores installed between the plurality of permanent magnets.

3. The rotating equipment of claim 1, wherein the rotor comprises:
    a surface attachment permanent magnet installation; and
    a pair of surface attachment permanent magnets which correspond to the respective pairs of the stators and are installed, along the circumferential direction, on an inner circumferential surface and an outer circumferential surface of the permanent magnet installation.

4. Rotating equipment comprising:
    a plurality of propeller modules comprising a plurality of blades installed along a circumferential direction; and
    a rotary module for rotating the plurality of propeller modules or being rotated by the plurality of propeller modules,
    wherein the rotary module comprises:
    a rotary shaft, at least one of two ends of which is coupled to the propeller modules;
    a body configured to rotatably support the rotary shaft; and
    an electric rotary drive which is installed in the body and rotates the rotary shaft coupled to the propeller modules,
    wherein the electric rotary drive comprises:
    a stator coupled to the body; and
    a rotor which is coupled to the rotary shaft and rotated by magnetic interaction with the stator,
    wherein the stator is installed in a pair with the rotor therebetween with respect to a radial direction, and
    wherein at least one of the plurality of propeller modules rotates in a different direction from another of the plurality of propeller modules.

5. The rotating equipment of claim 4, wherein the rotor comprises:
    a plurality of permanent magnets arranged at preset intervals along the circumferential direction; and
    a plurality of rotor cores installed between the plurality of permanent magnets.

6. The rotating equipment of claim 4, wherein the rotor comprises:
    a surface attachment permanent magnet installation; and
    a pair of surface attachment permanent magnets which correspond to the respective pairs of the stators and are installed, along the circumferential direction, on an inner circumferential surface and an outer circumferential surface of the permanent magnet installation.

* * * * *